(12) United States Patent
Anand et al.

(10) Patent No.: US 10,041,361 B2
(45) Date of Patent: Aug. 7, 2018

(54) TURBINE BLADE COATING COMPOSITION

(71) Applicant: General Electric Company, Schenectady, NY (US)

(72) Inventors: Krishnamurthy Anand, Bangalaore (IN); Surinder Singh Pabla, Greer, SC (US); Eklavya Calla, Bangalore (IN)

(73) Assignee: General Electric Company, Schenectady, NY (US)

( * ) Notice: Subject to any disclaimer, the term of this patent is extended or adjusted under 35 U.S.C. 154(b) by 321 days.

(21) Appl. No.: 14/514,455

(22) Filed: Oct. 15, 2014

(65) Prior Publication Data

US 2016/0108509 A1    Apr. 21, 2016

(51) Int. Cl.
*C23C 4/04* (2006.01)
*C23C 30/00* (2006.01)
(Continued)

(52) U.S. Cl.
CPC .............. *F01D 5/288* (2013.01); *B22F 1/025* (2013.01); *B22F 3/10* (2013.01); *C09D 1/00* (2013.01); *C09D 5/00* (2013.01); *C09D 5/031* (2013.01); *C09D 7/61* (2018.01); *C09D 7/66* (2018.01); *C22C 1/051* (2013.01); *C22C 29/005* (2013.01); *C23C 4/04* (2013.01); *C23C 4/06* (2013.01); *C23C 4/10* (2013.01); *C23C 4/11* (2016.01); *C23C 4/12* (2013.01); *C23C 4/129* (2016.01); *C23C 4/134* (2016.01); *C23C 24/00* (2013.01); *C23C 28/324* (2013.01); *C23F 13/06* (2013.01); *C23F 13/14* (2013.01); *B22F 2998/00* (2013.01); *B22F 2998/10* (2013.01); *F05D 2300/226* (2013.01); *F05D 2300/228* (2013.01); *Y10T 428/12535* (2015.01); *Y10T 428/12576* (2015.01); *Y10T 428/12597* (2015.01); *Y10T 428/12611* (2015.01);
(Continued)

(58) Field of Classification Search
CPC .. C23C 24/00; C23C 4/04; C23C 4/12; C23C 30/00; C23C 4/0467; C23C 4/0473; C23C 30/005; C23C 4/10; C23C 4/11; C23C 28/324; C23C 4/06; C23C 4/129; C23C 4/134; C23C 4/00; Y10T 428/12736; Y10T 428/12951; Y10T 428/12799; Y10T 428/12743; Y10T 428/12757; Y10T 428/12792; Y10T 428/12535; Y10T 428/12576; Y10T 428/12597; Y10T 428/12611; Y10T 428/12618; C09D 7/66; C09D 7/61; C22C 1/051; C22C 29/005; C22C 29/065; C22C 29/06; C22C 29/12; C22C 29/14; C22C 29/16; C22C 29/08; C22C 29/10; B22F 2998/00; B22F 2998/10; B22F 9/026; B22F 1/0096
See application file for complete search history.

(56) References Cited

U.S. PATENT DOCUMENTS 3,248,251 A * 4/1966 Allen .................... C04B 28/342
106/1.12
3,379,580 A   4/1968 Zeigler
(Continued)

*Primary Examiner* — Michael E. La Villa
(74) *Attorney, Agent, or Firm* — Nixon & Vanderhye P.C.

(57) ABSTRACT

A composition for a reinforced metal matrix coating, and a method of preparing and coating the composition. The composition includes a plurality of sacrificial metallic binder particles that is anodic with respect to a base substrate, and a plurality of hard particles.

16 Claims, 6 Drawing Sheets

(51) Int. Cl.
*C23C 4/12* (2016.01)
*F01D 5/28* (2006.01)
*B22F 1/02* (2006.01)
*B22F 3/10* (2006.01)
*C23F 13/14* (2006.01)
*C25D 5/50* (2006.01)
*C23C 4/10* (2016.01)
*C23C 28/00* (2006.01)
*C23C 24/00* (2006.01)
*C23C 4/11* (2016.01)
*C09D 5/00* (2006.01)
*C23F 13/06* (2006.01)
*C09D 1/00* (2006.01)
*C09D 5/03* (2006.01)
*C23C 4/06* (2016.01)
*C23C 4/129* (2016.01)
*C23C 4/134* (2016.01)
*C22C 1/05* (2006.01)
*C22C 29/00* (2006.01)
*C09D 7/61* (2018.01)
*C09D 7/40* (2018.01)

(52) U.S. Cl.
CPC .............. *Y10T 428/12618* (2015.01); *Y10T 428/12736* (2015.01); *Y10T 428/12743* (2015.01); *Y10T 428/12757* (2015.01); *Y10T 428/12792* (2015.01); *Y10T 428/12799* (2015.01); *Y10T 428/12951* (2015.01)

(56) References Cited

U.S. PATENT DOCUMENTS

| | | | |
|---|---|---|---|
| 3,956,080 A | 5/1976 | Hradcovsky et al. | |
| 5,260,099 A * | 11/1993 | Haskell | C23C 22/74 427/367 |
| 5,547,769 A | 8/1996 | Schmitz | |
| 7,037,418 B2 | 5/2006 | Brandon et al. | |
| 8,079,822 B2 | 12/2011 | Kitsunai et al. | |
| 2007/0261965 A1 | 11/2007 | Heller et al. | |
| 2009/0297720 A1 | 12/2009 | Ramgopal et al. | |
| 2010/0226783 A1* | 9/2010 | Lipkin | C23C 4/06 416/241 B |
| 2011/0008614 A1* | 1/2011 | Muth | C04B 35/6303 428/328 |
| 2011/0165433 A1 | 7/2011 | Pabla et al. | |
| 2013/0004323 A1 | 1/2013 | Hensen et al. | |
| 2013/0192982 A1 | 8/2013 | Watson et al. | |
| 2013/0192996 A1 | 8/2013 | Watson et al. | |
| 2015/0249413 A1* | 9/2015 | Ren | F03D 7/00 290/44 |

\* cited by examiner

TURBINE BLADE COATING COMPOSITION

The invention is directed to systems and methods of protecting a metal object for reducing efficiency loses due to erosion and corrosion.

BACKGROUND OF THE INVENTION

Compressors, such as an axial compressor, a centrifugal compressor, and a rotary compressor, often face problems with a reduction in working efficiency due to corrosions of the turbine blades used in the compressor system. Turbines are formed with stages of turbine blades, including rotor and stator blades. Efficiency tends to drop as the blades become corroded or fouled over time. The blades tend to collect deposits, such as iron oxide particulates and other oxide debris from the gases and fluids at the rear stages of the compressor turbine. Deterioration of blade surfaces due to fluids and gases during operation, and/or reactions with particulate deposits may be rapid. Such surface damages may not easily be removed by water wash because the deposits may not be water soluble.

It is well known in the industry that deterioration can be reduced by protecting the blade surfaces using a number of coating techniques. For instance, blade surfaces are known to be protected through pure coating on the blade. U.S. App. No. 2007/0261965 describes a composition and method to provide a coated object that has a high-temperature resistance. The coated object is produced by electrodeposition of one or more metal or metal alloy layers on a substrate and thermal treating the coated substrate such that the layers and the substrate partially and/or completely interdiffuse.

It is believed that, due to the potential corrosive and erosive working environment for a turbine blade, application of a hard, oxidation resistant coating may be desirable. In addition, down-time conditions in a compressor may result in possible moisture condensation in a corrosive environment to further enhance the deterioration of the blade surface. Known solutions to the problem include discussions in U.S. Patent App. Pub. No. 2009/0297720 and 2011/0165433.

BRIEF DESCRIPTION OF THE INVENTION

It is believed that to protect a metallic object from a potentially erosive and corrosive environment, a composite may be produced to endure the erosive and corrosive environment. The composite may include a protective metallic coating that is compatible with a base metal surface, and the metallic coating may include a metal alloy that incorporates other particles, such as hard particles, to strengthen the protective coating and reduce erosion of the coating to prolong protection. It is also believed that it may be desirable for a protective coating to be thin, which may increase uniformity of the layer and reduce process and material costs.

In particular, the present invention provides an approach to solve the problem that may reduce the turbine blade deterioration rate by providing a composite that includes a metallic coating having a reinforced metal matrix coating composition, the composition being anodic in nature, including a metallic base alloy that is sacrificial in nature, with the addition of hard particles that may act to protect the base metal, such as for a turbine blade.

A composite of the present invention includes: a base substrate, and a coating comprising a plurality of hard particles and a plurality of sacrificial metallic binder particles on a surface of the base substrate, the sacrificial metallic binder particles being anodic with respect to the base substrate. The coating has an electrochemical potential difference of at least about 50 mV with respect to the base substrate.

A method of preparing a feedstock powder of the present invention includes: preparing a plurality of sacrificial metallic binder particles, preparing a plurality of hard particles, blending the sacrificial metallic binder particles and the hard particles together in a liquid medium to bond the sacrificial metallic binder particles and the hard particles together to produce a plurality of bonded particles, separating the plurality of bonded particles from the liquid medium to produce a feedstock powder, and drying the feedstock powder.

A method of coating a base substrate according to the present invention includes: preparing a feedstock powder comprising a plurality of sacrificial metallic binder particles and a plurality of hard particles, and spraying a base substrate with the feedstock powder to form a coating on a surface of the base substrate. The coating has an electrochemical potential difference of at least about 50 mV with respect to the base substrate.

DETAILED DESCRIPTION OF THE INVENTION

Figure 1:
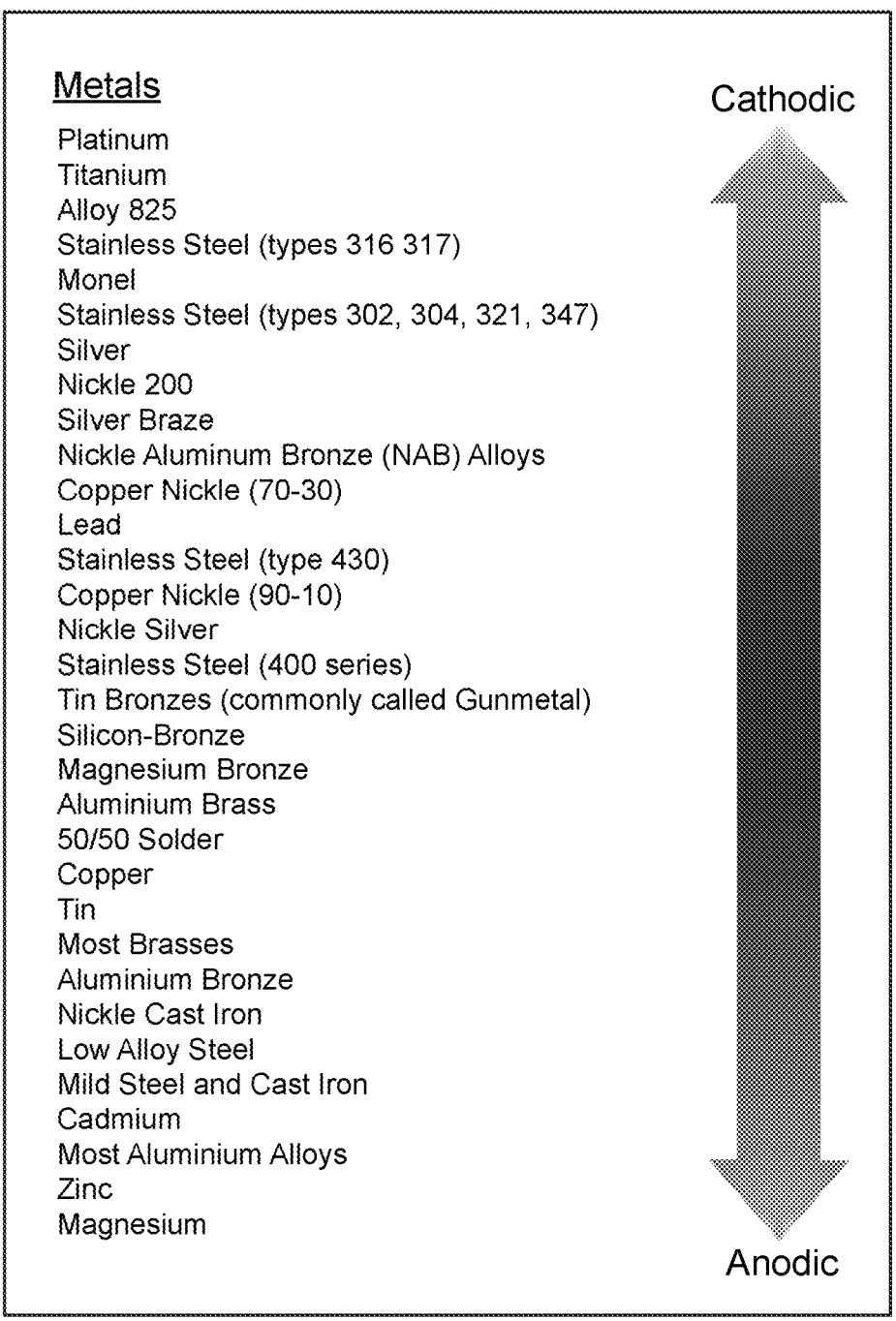
FIG. 1 is a chart that graphs several common metallic material based on respective electrochemical potentials, from the more anodic materials to the more cathodic materials.

The present invention provides an alternative approach to the conventional protective coating on a metallic surface, such as for a turbine blade. An embodiment of the present invention provides a single layer reinforced metal matrix coating that may be erosion and corrosion resistant.

It is believed that to provide a suitable protective coating for a turbine blade that undergoes erosive and corrosive environments, it is advantageous to coat the generally electropositive (i.e., cathodic) metallic base substrate with an electronegative (i.e., anodic) coating. Conventional turbine protective coatings may comprise two layers of coating: a base protective coating, and a hard layer that provides protection from erosion.

The present invention provides a single layer coating that includes both characteristics to protect the base substrate from both erosion and corrosion. Specifically, the present invention provides a protective coating layer that includes only two components, sacrificial metallic binder particles and hard particles.

As used in the present specification and claims, the terms are defined as follows.

"Sacrificial" is defined as a characteristic of a metal or metal alloy that may be more electronegative (i.e., anodic) than the base substrate, such that the anodic metal or metal alloy will be attacked first by corrosive agents in a corrosive environment.

"Hard particles" is defined as a plurality of particles of a compound that may withstand high velocity impact of materials that can erode a turbine blade during operation, and may have a Mohs hardness of between about 5 to about 10.

"Metal matrix" is a chemical matrix that is continuous throughout the composition.

"Metallic binder" is defined as a metal or metal alloy material that is a monolithic material which can form a metal matrix.

"Base substrate" is defined as a metallic base material that may be used for a turbine blade, such as a stainless steel 403CB+ base material and the like.

"Anodic" is defined as a characteristic of a material which has an electrochemical potential that is more electronegative than the respective material it is compared to.

"Cathodic" is defined as a characteristic of a material which has an electrochemical potential that is more electropositive than the respective material it is compared to.

"Feedstock" is defined as a material that is to be used as a basic material in a subsequent process or in an apparatus.

"Powder" is defined as a bulk substance that is made up of a plurality of particles in small sizes, such as very fine granular particles that may flow freely when shaken or tilted.

In the present invention, the sacrificial characteristic of a metal or metal alloy is defined as a characteristic of a metal or metal alloy that is more electronegative (i.e., anodic) than the base substrate, such that the anodic metal or metal alloy will be attacked first by corrosive agents in a corrosive environment. As described, the anodic metal or metal alloy may have a sacrificial characteristic with respect to the base substrate.

Any anodic metal or metal alloy that may be sacrificial with respect to a base substrate may be used in the present invention as sacrificial metallic binder particles, including metal and metal alloys such as aluminum, magnesium, zinc, aluminum alloys, cadmium, beryllium, nickel 20% aluminum alloy, and the like.

FIG. 1 provides a chart that shows different materials graphed with respect to the electrochemical potential of each material. Aluminum, magnesium, zinc, beryllium, aluminum alloys, and cadmium are at the top of the chart, graphed as most electronegative (i.e., anodic) and material such as graphite, gold, platinum, and titanium are graphed to be most electropositive (i.e., cathodic).

The coating layer and the base substrate preferably has an electrochemical potential difference of between about 50 mV to about 1000 mV, 50 mV to about 600 mV, particularly a difference of between about 50 mV to about 400 mV, and more particularly a difference of between about 50 mV to about 300 mV.

As used in connection to the parameters of the present invention, the word "about" refers to a range of 10% above and below the specified parameter.

If the electrochemical potential difference is higher than 1000 mV, then the metallic binder particles may be too easily corrosive to act as a protective agent to the base substrate. However, if the difference is lower than 50 mV, then the difference may be too marginal, and the metallic binder particles may not act sacrificially with respect to the base material.

The hard particles present in the coating composition have been found not to affect the electronegativity of the coating composition substantially, and thus the presence of hard particles may not affect the sacrificial characteristics of the metallic binder particles.

Technical advantages of the coating and composition as according to the present invention include:
Providing a hard inert coating that is anodic with respect to the base material, with improved resistance to erosion and deposition of corrosive and erosive material;
Providing an improved corrosion protection of the metallic objects during downtime;
Having the ability to better maintain a smooth surface finish on the metallic objects;
Providing a single layer coating that enables simple manufacturing and application; and
Having the ability to be mechanically compatible with a cold or thermal spray coating process for simple application of the coating and the ability to perform bake coating of the composition.

Further commercial advantages of the coating and composition as according to the present invention may include:
A moderate cost coating option; and
An ability to better maintain a smooth surface finish that reduces efficiency loss, which may amount to up to a 0.5% in efficiency loss reduction (for example, for a 200 MW capacity turbine, the loss reduction may be 1 MW per hour, or a $100 revenue increase per hour).

A coating of the present invention that provides the above mentioned advantages includes a coating that uses a sacrificial metal matrix hard particle composition. The composition includes only a plurality of sacrificial metallic binder particles, such as anodic metal or metal alloy particles that can form a metal matrix, and a plurality of hard particles embedded into the metal matrix to reinforce and strengthen the coating.

As known in the art, a metallic binder is a monolithic material that can form a metal matrix, into which reinforcement particles can be embedded. A metal matrix is a chemical matrix of the metallic binder that is continuous throughout the material, and the presently disclosed composition may form a coating that has a metal matrix with reinforcement material embedded into the matrix. The reinforcement material may have a continuous or a discontinuous matrix bonding.

An embodiment of the composition according to the present invention contains a two part composition that comprise (1) a plurality of sacrificial metallic binder particles using an anodic metal or metal alloy, and (2) a plurality of hard particles.

An embodiment of the coating may have a plurality of anodic metallic binder particles with respect to a base substrate, such as aluminum, magnesium, zinc, aluminum alloys, cadmium, beryllium, nickel 20% aluminum alloy, and the like. It is believed that anodic metallic binder particles may promote development of local anodic cells in the composition and coating. The anodic nature of the metallic binder particles may be sacrificial with respect to a cathodic base metal substrate, such that the metallic binder particles may be corroded first by the corrosive environment.

An exemplary composition may have an amount of sacrificial metallic binder particles that is between about 0.5 wt % to about 30 wt %, specifically about 5 wt % to about 20 wt %, more specifically about 10 wt % to about 15 wt % of the total weight of the composition.

According to the present invention, hard particles used in the composition refer to materials that can potentially withstand high velocity impact of material that can erode a turbine blade during operation, such as high velocity water droplets, silt, sand, and the like. The hard particles may have a Mohs hardness of between about 5 to about 10, with 10 being the hardness of a diamond. Particularly, the hard particles may have a Mohs hardness of between about 6.5 to about 9, more particularly between about 7.5 to about 8.5.

In an embodiment, hard particles used in the composition may be a plurality of the same or different particles, and the composition may have an amount of hard particles that is between about 70 wt % to 99.5 wt %, specifically about 75 wt % to 90 wt %, more specifically about 80 wt % to 85 wt % of the total weight of the composition.

Examples of the hard particles include tungsten carbide, molybdenum carbide, titanium carbide, titanium nitride, titanium boride, chromium carbide, chromium oxide, silicon carbide, silicon oxide, silicon nitride, boron nitride, magnesium boride, magnesium nitride, magnesium oxide, aluminum nitride, aluminum carbide, aluminum oxide, aluminum boride, zirconium oxide, titanium oxide, aluminum titanium oxide, and any transitional metal carbide, transitional metal oxide, and transitional metal nitride that may be anodic with respect to a conventional base metallic material used for a turbine blade in a compressor, and a combination thereof.

The hard particles may have an average particle size ranging between about 0.5 microns to about 3 microns, particularly about 1 micron to about 2.3 microns, more particularly about 1.5 to about 2 microns.

In an exemplary composition, a plurality of hard particles include chromium carbide particles that have a particle size of between about 0.5 to about 3.0 microns. The chromium carbide has a primary carbide content of about 50% of the chromium carbide such that chromium carbide hard particles may be tightly spaced to ensure that the particles provide a desirable hardness to the coating.

In an embodiment, a composition is provided in the form of a feedstock powder that comprises sacrificial metallic binder particles and hard particles. An exemplary method to prepare a feedstock powder includes:
  Preparing a plurality of sacrificial metallic binder particles in particulate form;
  Preparing a plurality of hard particle in particulate form;
  Blending the sacrificial metallic binder particles and the hard particles together in a liquid medium to bond the sacrificial metallic binder particles and the hard particles together and produce a plurality of bonded particles;
  Separating the plurality of bonded particles from the liquid medium to produce a feedstock powder; and
  Drying the mass of particles.

In an embodiment, the liquid medium may be an inorganic medium that promotes the bonding of the sacrificial metallic binder particles and hard particles. In another embodiment, the liquid medium may be an organic medium to prevent combustion while blending potentially combustible metallic binder particles and hard particles together. In a preferable composition, aluminum particles are used as the metallic binder, reinforced by a plurality of hard particles, and the aluminum particles and the hard particles are blended together in an organic liquid medium.

The particles may be bonded through mechanical alloying or through an agglomerate of the particles in a mixer, such as a shaker-mixer. There may be no chemical bonding occurring between the particles. After bonding, the bonded particles may be dried using spray drying techniques, or by sintering the bonded particles to about 600° C.

In an embodiment, the resulting feedstock powder may be in a flowable spherical powder form, with a powder size of between about 5 to 60 microns in diameter, particularly about 10 to 45 microns in diameter, and more particularly about 15 to 25 microns in diameter.

The feedstock powder of the present invention may be used as a base supply material in a cold spray process or a thermal spray process to apply a reinforced metal matrix coating onto a metallic surface, such as a stainless steel turbine blade made using a stainless steel 403CB+material. The reinforced metal matrix coating is believed to be oxidation resistant and anodic with respect to a base substrate to be coated.

A method of coating a base substrate using the feedstock powder of the present invention includes:
  Preparing a feedstock powder comprising a plurality of sacrificial metallic binder particles and a plurality of hard particles; and
  Spraying a base substrate with the feedstock powder to form a coating on a surface of the base substrate.

A conventional 403CB+ steel base material, for example, may have an electrochemical potential of about −400 mV. In an embodiment, the anodic coating to be applied onto the base material may have a composition comprising an aluminum based alloy that has an electrochemical potential of about −1000 mV, and strengthened with a dispersion of a plurality of hard particles, such as chromium carbide, silicon carbide, chromium oxide, or aluminum oxide particles. The electrochemical potential difference between the base material and the reinforced metal matrix coating is preferably between about 50 mV to 1000 mV, more preferably between about 100 mV to 600 mV, more preferably between about 150 mV to 300 mV.

The reinforced metal matrix coating may have the capability to withstand a temperature exposure of at least about 900° F., particularly at least about 1000° F., more particularly at least about 1050° F.

In an embodiment, the feedstock powder may be applied to a metallic surface using a cold spray coating process.

As known in the art, a cold spray coating process uses feedstock powder particles that are typically between 10 to 50 microns, and the particles are accelerated to very high velocities, such as between 200 to 1500 m/s, by a compressed gas. The particles may be moderately heated to a higher temperature during the spray process. Upon impact with a metal substrate, the particles experience extreme and rapid plastic deformation, which enables the particles to bond to the exposed metal surfaces. It is believed that a fine balance between particle size, density, temperature, and velocity may be important in achieving a desired coating. The particles remain in solid state and are relatively cold during the coating process, such that the particles do not melt in the coating process.

Advantages of the reinforced metal matrix coating composition used in a cold coating process as according to the present invention may be demonstrated using the example embodiments prepared and tested below.

Figure 2:
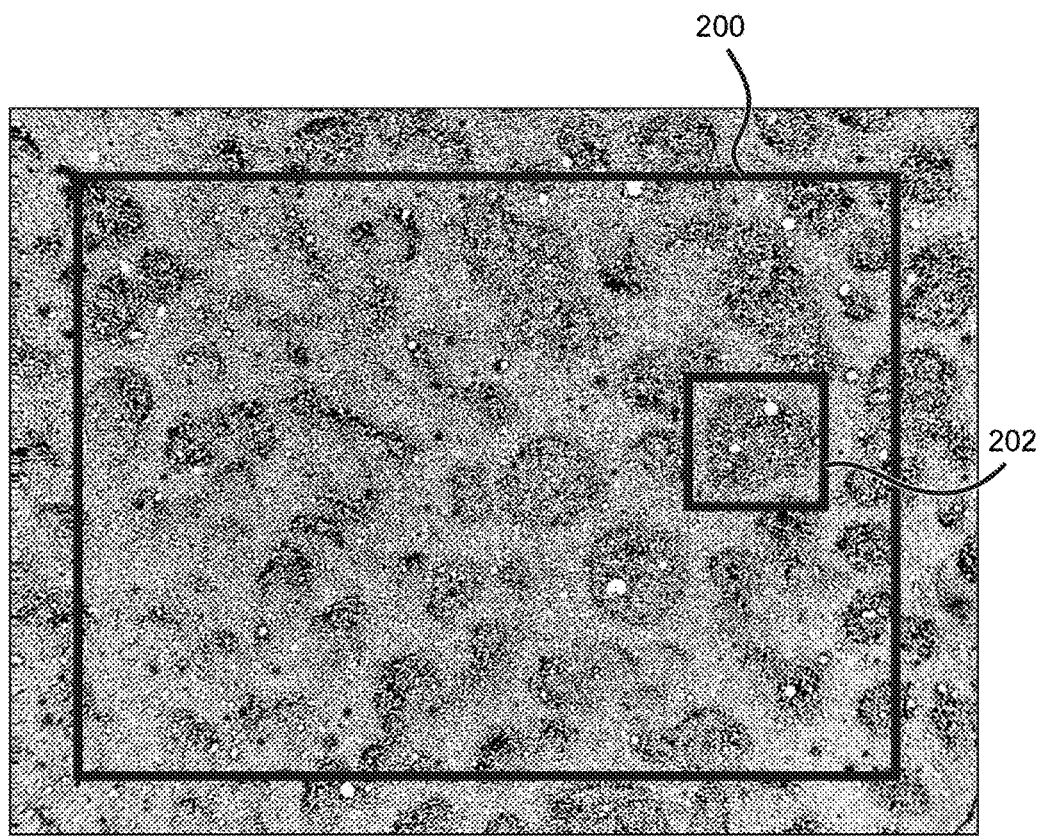
FIG. 2 shows a perspective view of an exemplary feedstock powder composition comprising only aluminum particles and hard particles.

FIG. 2 shows an electronic imaging of an exemplary feedstock powder 200 comprising only sacrificial metallic binder particles, such as aluminum particles, and hard particles including silicon, chromium, nickel, tungsten particles, and the like. The particles used to prepare the feedstock powder may be spherical. The feedstock powder 200 has been mixed in a shaker-mixer for about 4 hours. Within an embodiment feedstock powder, there may be a plurality of anodic pockets 202. Anodic pockets 202 may be formed by the sacrificial metallic binder particles, including aluminum particles, with hard particles embedded within and surrounding the sacrificial metallic binder particles.

Figure 3:
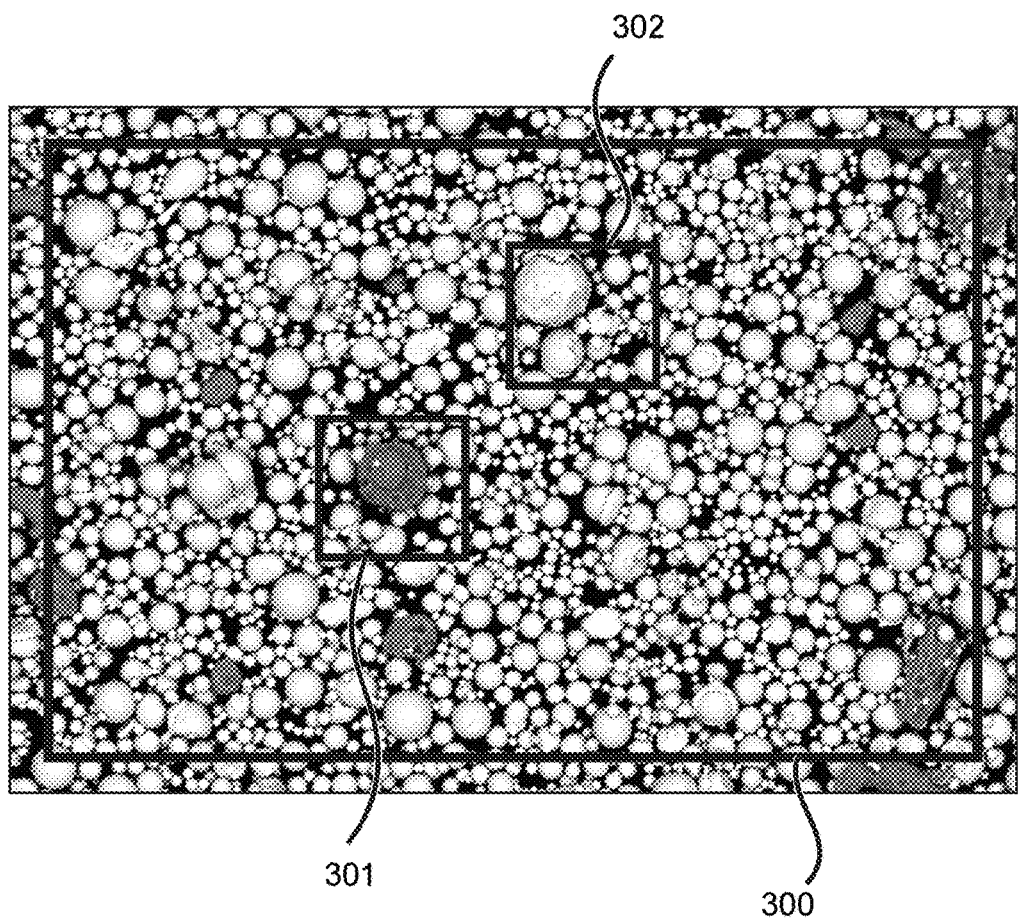
FIG. 3 shows a magnified view of an exemplary feedstock powder composition, showing enlarged particles at a magnification of 1.00 KX.

FIG. 3 provides a magnified view of an exemplary feedstock powder 300 at 1.00 KX magnification. The image shows larger sized aluminum particles 301 dispersed throughout the feedstock powder 300. The aluminum particles 301 may be angularly flattened during the mixing process, and may have some hard particles 302 physically embedded into the aluminum particles 301 during the mixing.

Figure 4:
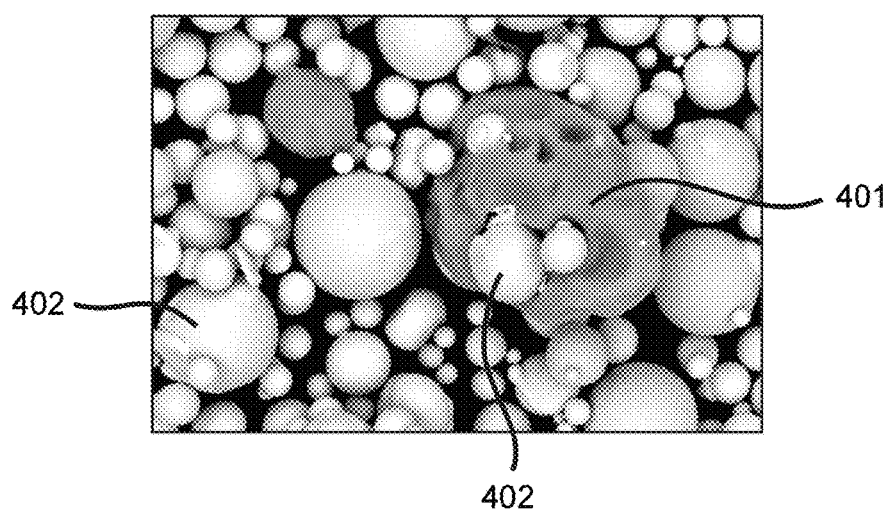
FIG. 4 shows a magnified view of an exemplary feedstock powder composition, showing enlarged particles at a magnification of 5.00 KX.

FIG. 4 provides a magnified view of an exemplary feedstock powder at 5.00 KX magnification. The aluminum particles 401 may be seen to have grooves and pockets, and the spherical hard particles 402, if smaller in size, may lodge into the aluminum particle 401 in a physical manner.

In an embodiment, an exemplary feedstock powder for use in a cold spray process may include metal and metal alloy particles that are larger in size than the hard particles.

For a cold spray process, it is believed that in order for the feedstock powder particles to achieve uniform plastic deformation, it may be desirable for the particles to achieve uniform velocity. However, as known in the art, aluminum particles, for example, may be less dense than the hard particles.

To accommodate for the difference in density and achieve uniform velocity of the particles, it may be desirable to use aluminum particles that are larger in particle size than the size of the hard particles particle size used in the same composition. Similarly, other metal or metal alloy particles that have a lower density than the hard particles may also be used in a composition, and desirable to have a larger size than the hard particles.

The less dense metal or metal alloy particles, such as aluminum particles, may be 2, 3, 4, or 5 times larger than the size of the hard particles.

Figure 5:
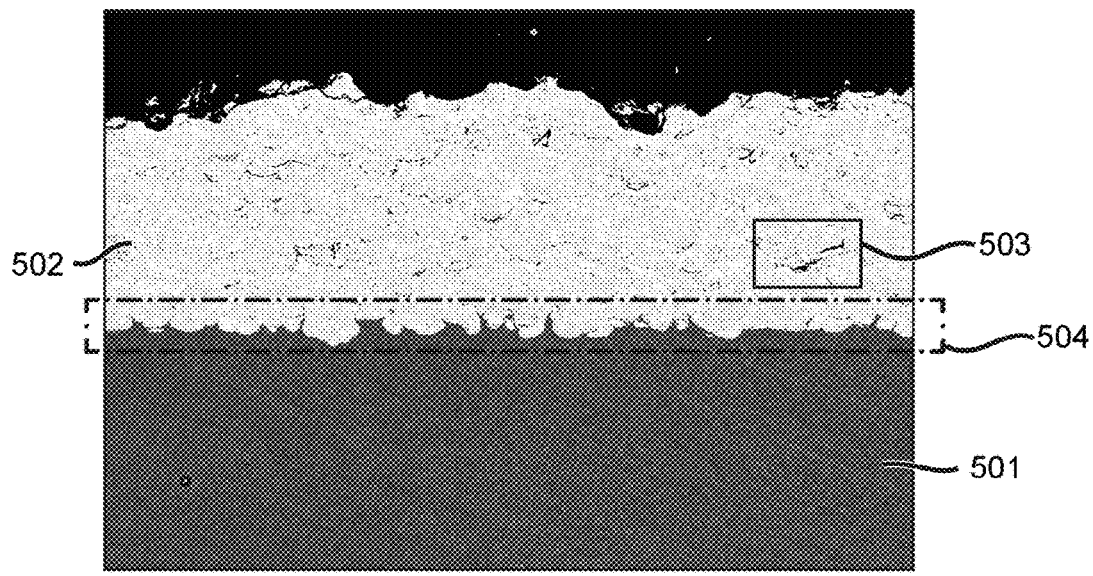
FIG. 5 shows a cross sectional view of a coated article, coated using an exemplary feedstock powder composition that comprises only aluminum particles and hard particles.

FIG. 5 provides a cross sectional view of a cold sprayed coating 502 on a metal base substrate 501 using an exemplary composition comprising aluminum particles and hard particles. It can be seen from FIG. 5 that the coating 502 has bonded to the base substrate 501 through plastic deformation of the aluminum particles and hard particles at an interface 504 of the coating 502 and the substrate 501. Plastic deformation of the particles may allow the coating to be well bonded to the base substrate.

At the interface 504, hard particles may be seen to be embedded into the plastically deformed aluminum particles. Even in the event of a breach in the coating that connects the corrosive media to the base material, i.e. creating a defective site 503, there is enough aluminum particles present at the defective sites to form an anodic island and protect the base material from corrosion.

In an exemplary embodiment that comprises 10 wt % aluminum particles and 90 wt % hard particles, prior to coating, the collective hard particles were measured to have a hardness of approximately 914 $HV_{0.3}$ without the aluminum particles. After coating, the overall coating hardness (including aluminum particles) was measured to be approximately 871 $HV_{0.3}$. Preferably, a coating with sacrificial particles and hard particles has a measured hardness of >1000 HV.

Figure 6:
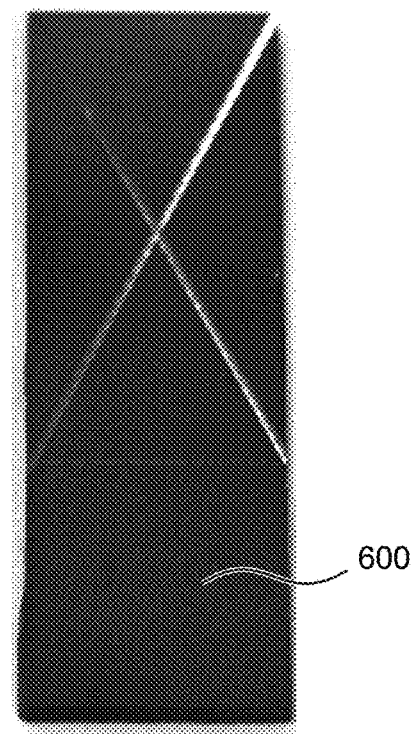
FIG. 6 provides a photograph of an exemplary coated article, coated using an embodiment composition that comprise 10 wt % aluminum and 90 wt % hard particles.

FIG. 6 shows a photograph of an exemplary coated article 600 using the feedstock powder composition of 10 wt % aluminum particles and 90 wt % hard particles, as described above. The coated article 700 can be seen to have a uniformly coated outer surface.

Figure 7:
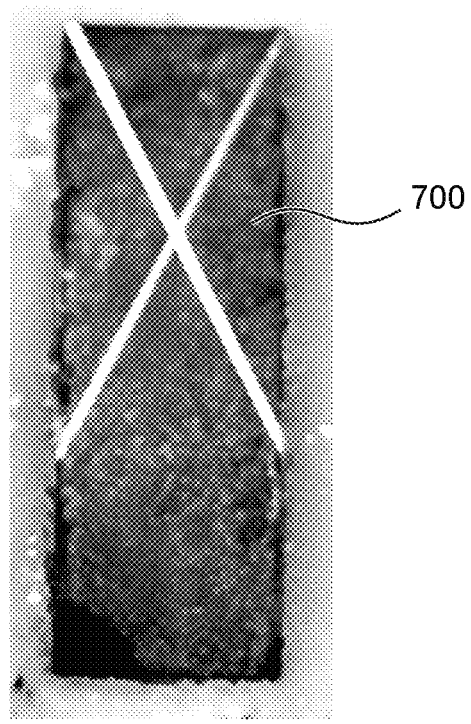
FIG. 7 provides a photograph of the exemplary coated article of FIG. 7 after undergoing a Salt Fog Test.

The coated article 600 was subsequently tested using a Salt Fog Test to mimic a potential corrosive environment that a turbine blade may undergo. A Salt Fog Test exposes specimens to a humid, salt-containing atmosphere, and assesses the corrosiveness of the specimen under such conditions. Coated article 600 was subjected to 143.47 hours of exposure under the Salt Fog Test. FIG. 7 shows a photograph of the tested coated article 700 after the Salt Fog Test. The tested coated article 700 can be seen to have a layer of white powder.

Figure 8:
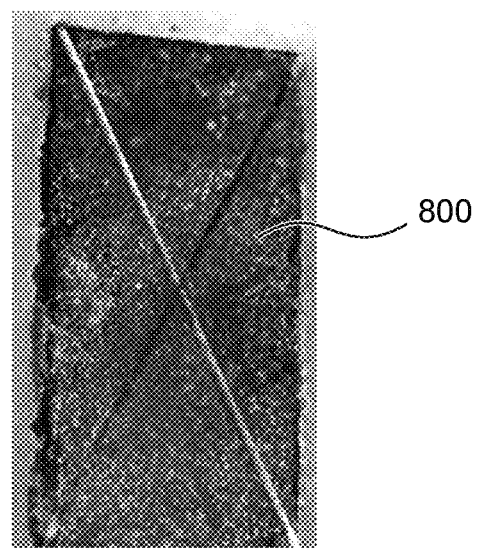
FIG. 8 provides a magnified photograph of the exemplary sample coated metal article of FIG. 7, showing surface details of the exemplary sample after undergoing a Salt Fog Test.

FIG. 8 further shows a magnified and detailed photograph of a portion of the tested coated article 700 shown in FIG. 7. A layer of white powder can be seen on the surface of the tested coated article 700, and there is no rust seen on the tested coated article 700 after the Salt Fog Test. It is believed that the white powder is aluminum hydroxide that has been precipitated from the tested coated article 700.

It is believed that during the Salt Fog Test, the sacrificial metallic binder particles (i.e., aluminum particles) reacted with the humid, salt-containing atmosphere to form aluminum hydroxide. Because aluminum hydroxide is seen to have formed without rust formation, it is thus believed that the base metal substrate is protected from the corrosive environment due to aluminum particles' sacrificial properties to react with the environment first. Through the Salt Fog Test, the 10% aluminum composition is believed to have proven the ability of the coating to perform with the advantages as described above in connection to the present invention.

Another exemplary embodiment comprising 20 wt % aluminum particles and 80 wt % hard particles has been prepared and tested in the same manner as described above. Prior to coating, the collective hard particles were measured to have a hardness of approximately 914 $HV_{0.3}$ without the aluminum particles. After coating, the overall coating hardness was measured to be approximately 821 $HV_{0.3}$, which is lower than the hardness measured for the 10 wt % aluminum particle coating (measured approximately 871 $HV_{0.3}$).

Figure 9:
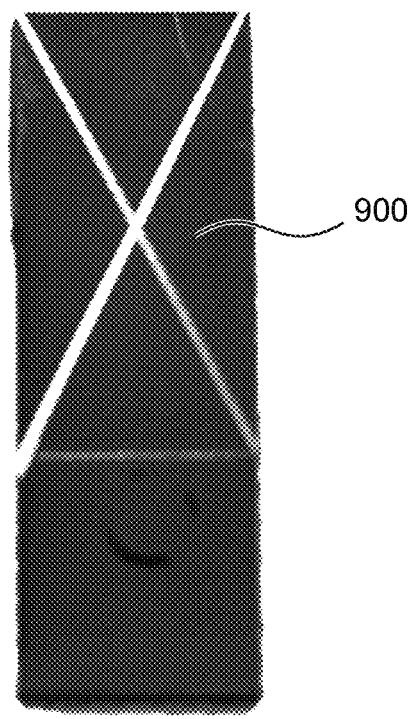
FIG. 9 provides a photograph of an exemplary coated article, coated using an embodiment composition that comprises 20 wt % aluminum particles and 80 wt % hard particles.
Figure 10:
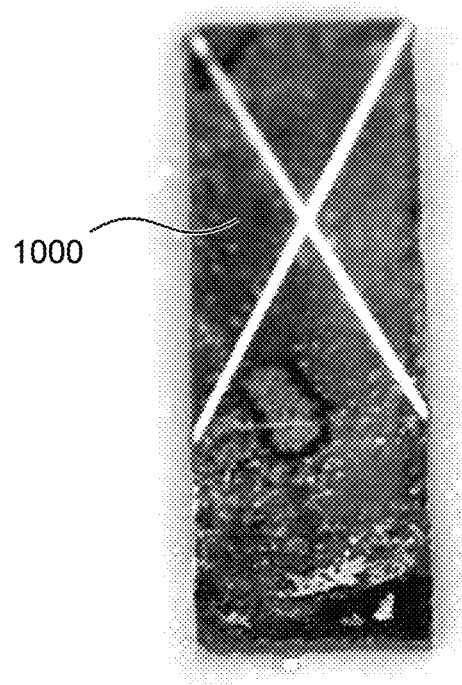
FIG. 10 provides a photograph of the exemplary coated article of FIG. 9 after undergoing a Salt Fog Test.

FIG. 9 is a photograph of an embodiment coated article 900 using the embodiment feedstock powder composition described. The coated article 900 can be seen to have a uniformly coated outer surface.

The coated articles 900 were also tested using a Salt Fog Test. The coated article 900 underwent the same Salt Fog Test with the coated article 600 described above for FIG. 6. The coated article 900 was subjected to 143.47 hours of exposure under the Salt Fog Test. FIG. 15 shows a photograph of the tested coated article 1000 after the Salt Fog Test. The tested coated article 1000 can be seen to have a layer of white powder on the surface. No rust is seen on the tested coated article 1000.

It is believed that, similar to the tested coated article 700, the white powder is aluminum hydroxide that has been precipitated from the coated article 900. It is also believed that a lack of rust formation with formation of white powder layer on the tested coated article 1000 proves that the aluminum particles in the protective coating may possess sacrificial properties.

Alternatively, a thermal spray coating process may be employed to produce a protective coating on a substrate metal. A thermal spray coating process is a coating process in which melted (or heated) materials are sprayed onto a surface. Exemplary thermal spray coating processes that may be employed using the feedstock powder of the present invention include high velocity oxygen fuel spraying (HVOF), plasma spraying, and detonation spraying.

In an embodiment, the feedstock powder may be used as a thermal spray feedstock using the HVOF process. The HVOF coating process may ensure partial melting of the Al based alloy, with a desirable partial decomposition of the hard particles, such as the chromium carbides into separate chromium and carbon particles in the binder to form chromium rich pockets in the resulting metal matrix. The density of hard particles may enable better passivation on the surface of the metallic object. In another embodiment, other thermal spraying process may also be employed to apply the hard anodic composition onto the metallic object, including plasma spraying and warm spraying.

After the sacrificial metallic binder particles, such as aluminum particles, are blended with hard particles (such as chromium carbide or chromium nitride, or chromium boride) the blended mixture of particles may be sprayed onto a metallic substrate surface using the HVOF process. Due to the high temperature, the hard particulates may decompose and release chromium particles, thereby embedding chromium particles into the aluminum matrix. When the aluminum becomes alloyed with other particles, such as chromium particles, the electrochemical potential difference between the matrix and the base material may decrease from >900 mV to become less than 600 mV, less than 400 mV, and between about 400 mV to 300 mV. While the anodic nature of the coating may be retained, the potential differences that drive corrosion rates during operation may become reduced, thus maintaining the combination of anodicity and corrosion resistance.

In another embodiment, a reinforced metal matrix coating may be formed on a metallic surface by using an adhesive tape comprising a composition of aluminum alloy and hard particles. An exemplary method to prepare the reinforced metal matrix coating composition as an adhesive tape includes:

Providing a layer of precursors that includes binder polymers. The precursor layer may include Sn powder as a sintering aid to facilitate a diffusion bond of the Al based alloy and Sn onto the base metallic object;

Depositing a layer of the feedstock powder on top of the layer of precursors;

The prepared tape may be applied to a metallic object surface, such as a stainless steel turbine blade, using a process including:

Placing one or more layers of the prepared tape onto the metallic object surface; and Burning the tape to burn off the polymer present in the tape, and facilitate diffusion bond of the Al and Sn onto the metallic object surface.

A polymeric tape, such as a poly-vinyl acetate with an adhesive backing, may be sprinkled with the desired composite powder comprising hard particles and anodic metallic additives, e.g. sacrificial metallic binder particles, along with a low temperature braze powder. The tape and the particles may be subject to a moderate pressure rolling so that the powders may get mechanically anchored to an adhesive backed PVA tape. The resulting tape may be applied onto an airfoil surface in a water turbine.

After the composition is applied to the metallic surface, such as through the cold spray coating process, the thermal spray coating process, or applying an exemplary adhesive tape to the metallic surface, the coating may be mechanically finished using drag finishing techniques, such as being subjected to a series of tumblers that includes a progressively finer abrasive media. The finished coating may have a surface roughness of about 0 to 45 microinches, particularly about 5 to 30 inches, more particularly about 10 to 25 microinches.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A composite comprising:
a base substrate; and
a single layer coating comprising a plurality of hard particles and a plurality of sacrificial metallic binder particles on a surface of the base substrate, the sacrificial metallic binder particles being anodic with respect to the base substrate;
wherein the sacrificial metallic binder particles are present in an amount of about 0.5 wt % of the total weight of the sacrificial metallic binder particles and hard particles in the coating, and the sacrificial metallic binder particles are selected from the group consisting of aluminum and aluminum alloys;
wherein the hard particles are present in an amount of about 99.5 wt % of the total weight of the sacrificial metallic binder particles and hard particles in the coating; and
wherein the coating has an electrochemical potential difference of between about 50 mV to about 1000 mV with respect to the base substrate.

2. The composite of claim 1, wherein the plurality of hard particles is selected from the group consisting of tungsten carbide, molybdenum carbide, titanium carbide, titanium nitride, titanium boride, chromium carbide, chromium oxide, chromium nitride, chromium boride, silicon carbide, silicon oxide, silicon nitride, boron nitride, magnesium boride, magnesium nitride, magnesium oxide, aluminum nitride, aluminum carbide, aluminum oxide, aluminum boride, zirconium oxide, titanium oxide, aluminum titanium oxide, and combinations thereof.

3. The composite of claim 1, wherein the coating has an electrochemical potential difference of between about 50 mV to about 600 mV with respect to the base substrate.

4. The composite of claim 1, wherein the hard particles have a Mohs hardness of between about 5 to about 10.

5. The composite of claim 1, wherein the hard particles have an average particle size ranging between about 0.5 microns to about 3 microns.

6. The composite of claim 1, wherein the base substrate is made from a stainless steel material.

7. A composite comprising:
a base substrate; and
a single layer coating comprising a plurality of hard particles and a plurality of sacrificial metallic binder particles on a surface of the base substrate, the sacrificial metallic binder particles being anodic with respect to the base substrate;

wherein the sacrificial metallic binder particles are present in an amount of about 10 wt % of the total weight of the sacrificial metallic binder particles and hard particles in the coating, and the sacrificial metallic binder particles are selected from the group consisting of aluminum and aluminum alloys;

wherein the hard particles are present in an amount of about 90 wt % of the total weight of the sacrificial metallic binder particles and hard particles in the coating; and wherein the coating has an electrochemical potential difference of between about 50 mV to about 1000 mV with respect to the base substrate.

8. The composite of claim 7, wherein the plurality of hard particles is selected from the group consisting of tungsten carbide, molybdenum carbide, titanium carbide, titanium nitride, titanium boride, chromium carbide, chromium oxide, chromium nitride, chromium boride, silicon carbide, silicon oxide, silicon nitride, boron nitride, magnesium boride, magnesium nitride, magnesium oxide, aluminum nitride, aluminum carbide, aluminum oxide, aluminum boride, zirconium oxide, titanium oxide, aluminum titanium oxide, and combinations thereof.

9. The composite of claim 7, wherein the coating has an electrochemical potential difference of between about 50 mV to about 600 mV with respect to the base substrate.

10. The composite of claim 7, wherein the hard particles have a Mohs hardness of between about 5 to about 10.

11. The composite of claim 7, wherein the hard particles have an average particle size ranging between about 0.5 microns to about 3 microns.

12. The composite of claim 7, wherein the base substrate is made from a stainless steel material.

13. A composite comprising:
a base substrate; and
a single layer coating comprising a plurality of hard particles and a plurality of sacrificial metallic binder particles on a surface of the base substrate, the sacrificial metallic binder particles being anodic with respect to the base substrate;

wherein the sacrificial metallic binder particles are present in an amount of about 20 wt % of the total weight of the sacrificial metallic binder particles and hard particles in the coating, and the sacrificial metallic binder particles are selected from the group consisting of aluminum and aluminum alloys;

wherein the hard particles are present in an amount of about 80 wt % of the total weight of the sacrificial metallic binder particles and hard particles in the coating; and wherein the coating has an electrochemical potential difference of between about 50 mV to about 1000 mV with respect to the base substrate.

14. The composite of claim 13, wherein the plurality of hard particles is selected from the group consisting of tungsten carbide, molybdenum carbide, titanium carbide, titanium nitride, titanium boride, chromium carbide, chromium oxide, chromium nitride, chromium boride, silicon carbide, silicon oxide, silicon nitride, boron nitride, magnesium boride, magnesium nitride, magnesium oxide, aluminum nitride, aluminum carbide, aluminum oxide, aluminum boride, zirconium oxide, titanium oxide, aluminum titanium oxide, and combinations thereof.

15. The composite of claim 13, wherein the hard particles have a Mohs hardness of between about 5 to about 10.

16. The composite of claim 13, wherein the hard particles have an average particle size ranging between about 0.5 microns to about 3 microns.

* * * * *